(12) United States Patent
Huang et al.

(10) Patent No.: US 11,836,174 B2
(45) Date of Patent: Dec. 5, 2023

(54) METHOD AND APPARATUS OF ESTABLISHING SIMILARITY MODEL FOR RETRIEVING GEOGRAPHIC LOCATION

(71) Applicant: Baidu Online Network Technology (Beijing) Co., Ltd., Beijing (CN)

(72) Inventors: Jizhou Huang, Beijing (CN); Haifeng Wang, Beijing (CN); Miao Fan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 305 days.

(21) Appl. No.: 17/416,705

(22) PCT Filed: Nov. 25, 2020

(86) PCT No.: PCT/CN2020/131320
§ 371 (c)(1),
(2) Date: Jun. 21, 2021

(87) PCT Pub. No.: WO2021/212826
PCT Pub. Date: Oct. 28, 2021

(65) Prior Publication Data
US 2022/0335074 A1    Oct. 20, 2022

(30) Foreign Application Priority Data
Apr. 24, 2020    (CN) .......................... 202010335198.4

(51) Int. Cl.
*G06F 16/33* (2019.01)
*G06F 16/335* (2019.01)
(Continued)

(52) U.S. Cl.
CPC ...... *G06F 16/3347* (2019.01); *G06F 11/3438* (2013.01); *G06F 16/335* (2019.01);
(Continued)

(58) Field of Classification Search
None
See application file for complete search history.

(56) References Cited

U.S. PATENT DOCUMENTS

| 7,373,591 B2 | 5/2008 | Mory et al. |
| 2002/0138517 A1 | 9/2002 | Mory et al. |
| (Continued) | | |

FOREIGN PATENT DOCUMENTS

| CN | 1401188 A | 3/2003 |
| CN | 101136028 A | 3/2008 |
| (Continued) | | |

OTHER PUBLICATIONS

Official Communication issued in corresponding Chinese Patent Application No. 202010334224.1, dated Feb. 1, 2023.
(Continued)

*Primary Examiner* — Christopher J Raab
(74) *Attorney, Agent, or Firm* — Keating & Bennett, LLP

(57) ABSTRACT

The present disclosure provides a method of retrieving a geographic location as well as a method and an apparatus of establishing a similarity model including: acquiring training data from a historical click log, wherein the training data contains a search term, a clicked geographic location associated with the search term as a positive sample, and a non-clicked geographic location as a negative sample; expanding the positive sample and the negative sample based on a co-occurrence relationship between geographic locations by using a historical browsing log; and determining a vector representation of the search term by using the first neural network, and determining a vector representation of the positive sample expanded and a vector representation of the negative sample expanded, by using the second neural network; and training the first neural network and the second
(Continued)

neural network so as to maximum a difference between a first similarity and a second similarity.

13 Claims, 7 Drawing Sheets

(51) Int. Cl.
  *G06F 11/34* (2006.01)
  *G06N 3/08* (2023.01)
  *G06F 18/22* (2023.01)
  *G06N 3/045* (2023.01)

(52) U.S. Cl.
  CPC .............. *G06F 18/22* (2023.01); *G06N 3/045* (2023.01); *G06N 3/08* (2013.01)

(56) References Cited

U.S. PATENT DOCUMENTS

| | | |
|---|---|---|
| 2009/0238474 A1 | 9/2009 | Sandberg |
| 2012/0265760 A1 | 10/2012 | Yan et al. |
| 2013/0326025 A1 | 12/2013 | Clark |
| 2015/0379017 A1* | 12/2015 | Seth .................. G06F 16/29 707/724 |
| 2016/0012482 A1* | 1/2016 | Doubleday ........ G06Q 30/0259 705/14.54 |
| 2017/0154055 A1* | 6/2017 | Dimson .............. G06F 16/5838 |
| 2019/0065506 A1* | 2/2019 | Li ........................ G06N 3/042 |
| 2020/0004886 A1* | 1/2020 | Ramanath ............ G06F 16/248 |
| 2021/0224286 A1* | 7/2021 | Wu ................... G06F 16/24578 |
| 2022/0019632 A1* | 1/2022 | Huang ................. G06F 16/29 |

FOREIGN PATENT DOCUMENTS

| | | |
|---|---|---|
| CN | 103714092 A | 4/2014 |
| CN | 104123319 A | 10/2014 |
| CN | 104834721 A | 8/2015 |
| CN | 106547887 A | 3/2017 |
| CN | 106610972 A | 5/2017 |
| CN | 107220312 A | 9/2017 |
| CN | 107562716 A | 1/2018 |
| CN | 108197203 A | 6/2018 |
| CN | 108415900 A | 8/2018 |
| CN | 109408814 A | 3/2019 |
| CN | 109801100 A | 5/2019 |
| CN | 110019668 A | 7/2019 |
| CN | 110162593 A | 8/2019 |
| CN | 110377686 A | 10/2019 |
| CN | 110674419 A | 1/2020 |
| CN | 110765368 A | 2/2020 |
| CN | 111026937 A | 4/2020 |
| CN | 111666292 A | 9/2020 |
| CN | 111666461 A | 9/2020 |

OTHER PUBLICATIONS

Official Communication issued in corresponding Chinese Patent Application No. 202010335198.4, dated Feb. 7, 2023.
Fen, "The research on the technology of geo-localization based outdoor scene Retrieval", Hangzhou Dianzi University, Aug. 31, 2016, 60 pages.
Li et al., "An Efficient Distributed-Computing Framework for Association-Rule-Based Recommendation", Chinese Journal of Computers vol. 42 No. 6, Jan. 31, 2019, pp. 1218-1231.
Wang et al., "Personalized query expansion based on an expert system for mobile search", 8th International Conference on Wireless Communications, Networking and Mobile Computing, Institute of Electrical and Electronics Engineers (IEEE), Mar. 14, 2013, 4 pages.
Jawanpuria et al., "A Simple Approach to Learning Unsupervised Multilingual Embeddings", 2020 Conference on Empirical Methods in Natural Language Processing, https://arxiv.org/abs/2004.05991v1, Nov. 16-20, 2020, pp. 2995-3001.
Yoshida et al., "A tourist search system based on the semantic expression of subjective features using distributed representation of user reviews", Japanese Society of information and Communication Engineers, http://db-event.jpn.org/deim2017/papers/86.pdf. Feb. 27, 2017, 5 pages.
Official Communication issued in Japanese Patent Application No. 2021-536167, dated Aug. 2, 2022.
Official Communication issued in International Patent Application No. PCT/CN2020/131321, dated Feb. 20, 2021.
Official Communication issued in corresponding European Patent Application No. 20875658.5 dated Jan. 5, 2022.
Official Communication issued in corresponding European Patent Application No. 20900684.0 dated Feb. 22, 2022.
Official Communication issued in International Patent Application No. PCT/CN2020/131320, dated Feb. 26, 2021.
Official Communication issued in corresponding European Patent Application No. 20900684.0, dated May 11, 2023.

* cited by examiner

METHOD AND APPARATUS OF ESTABLISHING SIMILARITY MODEL FOR RETRIEVING GEOGRAPHIC LOCATION

CROSS REFERENCE TO RELATED APPLICATION(S)

This application is a Section 371 National Stage Application of International Application PCT/CN2020/131320 filed on Nov. 25, 2020, which claims priority to Chinese patent Application No. 202010335198.4 entitled "method and apparatus of establishing a similarity model for retrieving geographic location" and filed on Apr. 24, 2020, and the content of which are incorporated herein by reference in their entirety.

TECHNICAL FIELD

The present disclosure relates to a field of computer application technology, and in particular to a field of artificial intelligence technology.

BACKGROUND

For map applications, geographic location retrieval is one of the most frequently used functions by users. Regardless of whether on a client side or on a web page, a user may retrieve a geographic location by entering a search term in a form of text or voice at an entrance of a search function.

Existing methods of retrieving geographic locations are mostly based on a similarity between the search term and a name of the geographic location. Currently, when establishing a similarity model for retrieving the geographic location, an implementation method based on a historical click log is adopted. This method relies on large-scale click data. For geographic locations that frequently appear and are clicked, the model has an excellent effect on sorting of search results. However, for those geographic locations with sparse occurrences, or those geographic locations that even have never appeared, the search results given by the model are very poor, that is, a cold start of a retrieval of the geographic location with sparse historical click logs may not be achieved.

SUMMARY

In view of this, the present disclosure provides a method and apparatus of establishing a similarity model for retrieving a geographic location, and a computer storage medium.

According to one aspect of the present disclosure, there is provided a method of establishing a similarity model for retrieving a geographic location, including:
  acquiring training data from a historical click log, wherein the training data contains a search term, a clicked geographic location associated with the search term as a positive sample, and a non-clicked geographic location as a negative sample;
  expanding the positive sample and the negative sample based on a co-occurrence relationship between geographic locations by using a historical browsing log; and
  performing a training by using the positive sample and the negative sample expanded so as to obtain the similarity model containing a first neural network and a second neural network;

wherein the performing a training includes:
  determining a vector representation of the search term by using the first neural network, and determining a vector representation of the positive sample expanded and a vector representation of the negative sample expanded, by using the second neural network; and
  training the first neural network and the second neural network so as to maximum a difference between a first similarity and a second similarity, wherein the first similarity is a similarity between the vector representation of the search term and the vector representation of the positive sample, and the second similarity is a similarity between the vector representation of the search term and the vector representation of the negative sample.

According to another aspect of the present disclosure, there is provided an apparatus of establishing a similarity model for retrieving a geographic location, including:
  a sample acquisition unit configured to acquire training data from a historical click log, wherein the training data contains a search term, a clicked geographic location associated with the search term as a positive sample, and a non-clicked geographic location as a negative sample;
  a sample expansion unit configured to expand the positive sample and the negative sample based on a co-occurrence relationship between geographic locations by using a historical browsing log; and
  a model training unit configured to perform a training by using the positive sample and the negative sample expanded so as to obtain the similarity model containing a first neural network and a second neural network, wherein the model training unit is configured to:
  determine a vector representation of the search term by using the first neural network, and determining a vector representation of the positive sample expanded and a vector representation of the negative sample expanded, by using the second neural network; and
  train the first neural network and the second neural network so as to maximum a difference between a first similarity and a second similarity, wherein the first similarity is a similarity between the vector representation of the search term and the vector representation of the positive sample, and the second similarity is a similarity between the vector representation of the search term and the vector representation of the negative sample.

According to another aspect of the present disclosure, there is further provided an electronic device, including: at least one processor; and a memory communicatively connected to the at least one processor, wherein the memory stores instructions executable by the at least one processor, and the instructions, when executed by the at least one processor, cause the at least one processor to implement the method described above.

According to another aspect of the present disclosure, there is further provided a non-transitory computer-readable storage medium having computer instructions stored thereon, and the computer instructions, when executed by a computer, causes the computer to implement the method described above.

Other effects of the optional manners described above will be described below in conjunction with specific embodiments.

BRIEF DESCRIPTION OF THE DRAWINGS

The drawings are used to better understand the solution and do not constitute a limitation to the present disclosure. wherein.

DETAILED DESCRIPTION OF EMBODIMENTS

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

Figure 1:
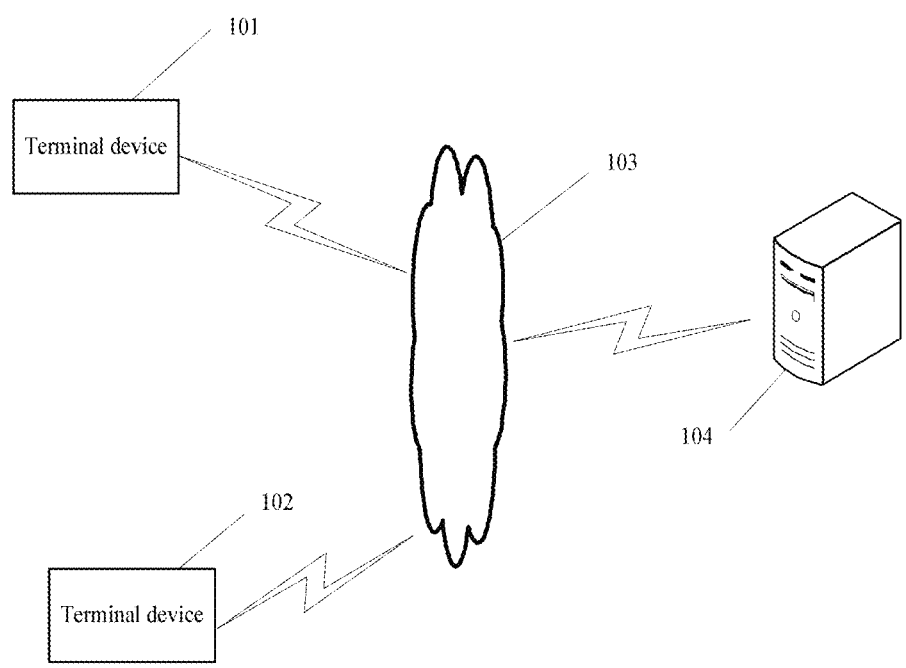
FIG. 1 shows an exemplary system architecture to which embodiments of the present disclosure may be applied.

FIG. 1 shows an exemplary system architecture to which the embodiments of the present disclosure may be applied. As shown in FIG. 1, the system architecture may include terminal devices 101 and 102, a network 103, and a server 104. The network 103 is used to provide a medium for a communication link between the terminal devices 101, 102 and the server 105. The network 103 may include various connection types, such as wired or wireless communication links, fiber-optic cables, and so on.

A user may use the terminal devices 101 and 102 to interact with the server 104 through the network 103. Various applications, such as map applications, voice interaction applications, web browser applications and communication applications, may be installed on the terminal devices 101 and 102.

The terminal devices 101 and 102 may be various electronic devices that may support and display map applications, including but not limited to smart phones, tablet computers, smart wearable devices, and so on. The apparatus provided by the embodiments of the present disclosure may be provided and run in the server 104. It may be implemented as multiple software or software modules (for example, to provide distributed services), or as a single software or software module, which is not specifically limited here.

For example, the apparatus of establishing the similarity model is provided and runs in the server 104, and the server 104 may acquire and record user's relevant behaviors of using map applications, thereby forming a historical click log, a historical browsing log, and the like. The information is used to establish the similarity model used for retrieving a geographic location based on a search term after receiving a search request containing the search term. For example, the server 104 may receive the search request containing the search term from the terminal device 101 or 102. The apparatus retrieves the geographic location by using the method provided by the embodiments of the present disclosure, and returns a retrieval result to the terminal device 101 or 102. A map database is maintained on the server 104. The map database may be stored locally in the server 104, or may be stored in other servers and called by the server 104.

The server 104 may be a single server, or a server group including a plurality of servers. It should be understood that the number of the terminal devices, network and server in FIG. 1 is only illustrative. The system architecture may include any number of terminal devices, networks and servers according to implementation needs.

In the present disclosure, in order to enable the geographic location with sparse clicks or the geographic location that has never been clicked (such as a newly-appearing geographic location) to obtain a good search sorting result as much as possible, the existing high-frequency clicked geographic location and a low-frequency clicked or non-clicked geographic location are correlated from another perspective. Therefore, a core idea of the present disclosure is that in addition to the historical click log, the historical browsing log is introduced in the model training process, and the correlation between the geographic locations is established based on the browsing co-occurrence relationship, thereby expanding the training data for training the similarity model. The method and apparatus provided in the present disclosure will be described in detail below in conjunction with the embodiments.

In order to facilitate the understanding of the method of establishing the similarity model, a structure and principle of the similarity model to be established in the present disclosure is firstly described in conjunction with a first embodiment.

The similarity model provided in the present disclosure is used to, after receiving a search term inputted by a user, retrieve a geographic location matching the search term inputted by the user. The similarity model provided in the present disclosure contains at least a first neural network and a second neural network. The first neural network is used to determine a vector representation of the search term, and the second neural network is used to determine a vector representation of each geographic location in a map database. Then, a similarity between the vector representation of the search term and the vector representation of the each geographic location is calculated, and the geographic location is retrieved according to the similarity.

Figure 2:
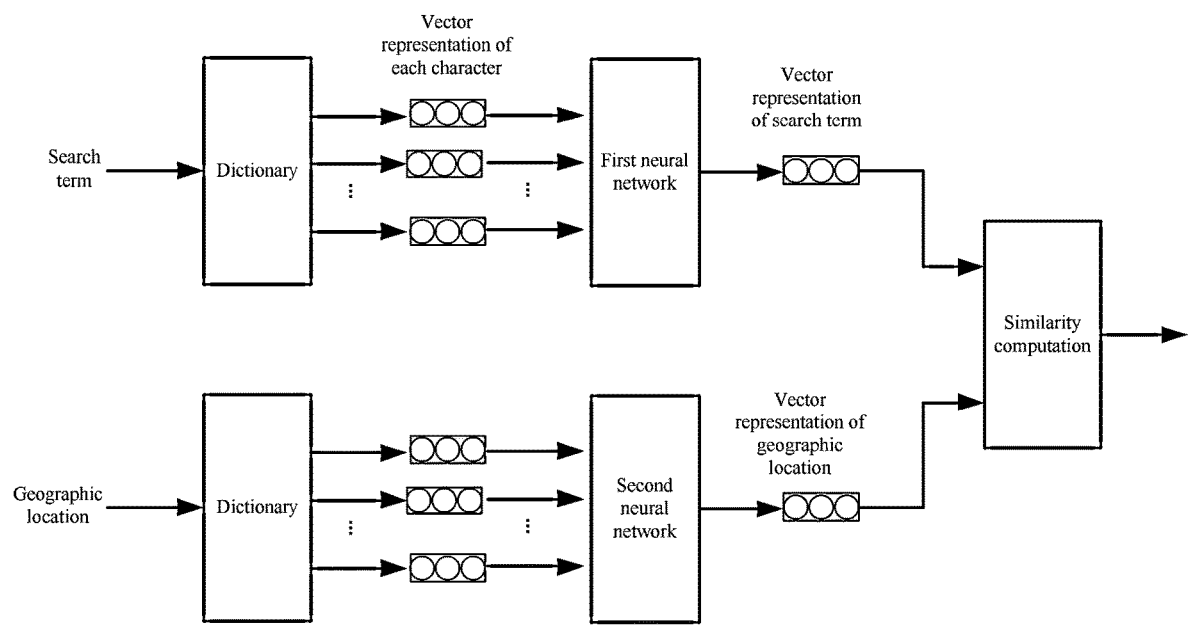
FIG. 2 shows a schematic principle diagram of a similarity model provided in an embodiment of the present disclosure.

A schematic structural diagram of an exemplary similarity model is provided below, as shown in FIG. 2. When the search term inputted by the user is acquired, a vector representation of each character in the search term is determined by using a character vector representation dictionary (shown as "dictionary").

In this embodiment, the character vector representation dictionary is used to map each character to the same vector representation. The character vector representation dictionary may be established for different languages. As an exemplary embodiment, in order to meet the requirements of cross-language geographic location retrieval, the character vector representation dictionary used in the embodiments of the present disclosure may be an international character vector representation dictionary. The international character vector representation dictionary is used to map characters of at least two languages to the same vector space, so that characters of different languages may be quantified to obtain one vector representation. The vector representation mapped from characters of all languages has the same dimension.

By way of example, for the search term "ABC", character vector representations of "A", "B" and "C" are respectively determined by using the international character vector representation dictionary.

Suppose c is a character which may be any language character supported by the dictionary, and C is the vector representation of c, then C is expressed as:

$$C=D(c)$$

where D( ) is a mapping function used in the international character vector representation dictionary.

Similarly, each character in a description text of each geographic location in the map database may be mapped to the vector representation of the each character by using the character vector representation dictionary. Exemplarily, the character vector representation dictionary is the international character vector representation dictionary. The geographic location involved in the present disclosure, including the geographic location in the map database, refers to a geographic location point in a map application, which may be retrieved, browsed and recommended to the user. The geographic location point has basic attributes of longitude and latitude, name, administrative address, type, and so on. The geographic location point may include but is not limited to POI (Point Of Interest), AOI (Area Of Interest), ROI (Region Of Interest), and so on.

In order to not only retrieve the geographic location with a name matching the search term, but also retrieve the geographic location with description information matching the search term, the vector representation of each character in a description text of the geographic location is first determined, and then the vector representation of the geographic location is further determined. The description text may contain but is not limited to at least one of a name, a label, an address, an evaluation and a photo description text. The information of the description text may also be stored and maintained in the map database.

For example, the description text of the geographic location point "Restaurant A (XX1 store)" contains:

Name—"Restaurant A (XX1 store)",
Address—"2$^{nd}$ Floor, No. 15-6, XX1, Xicheng District, Beijing",
Labels—"chain", "convenient transportation", "working meal", "western fast food", etc.,
Evaluation—"good taste", "popular", "suitable for parent-child", etc.
. . . .

Each character in the description text may be mapped into a vector representation of the each character by using the international character vector representation dictionary.

The vector representation of the each character of the search term is input into the first neural network, so as to obtain the vector representation of the search term as an output. The vector representation of the each character in the description text of the geographic location is inputted into the second neural network, so as to obtain the vector representation of the geographic location. In this way, the vector representation of the each geographic location in the map database may be obtained.

The present disclosure does not limit the types of the first neural network and the second neural network, as long as the output vectors of the two neural networks have the same dimension. For example, CNN (Convolutional Neural Networks) and ERNIE (Enhanced Representation through kNnowledge IntEgration) may be used as the two neural networks. In addition, it should be noted that the terms "first", "second" and so on involved in the embodiments of the present disclosure are only for distinguishing in terms of names, and do not have limitations on meanings such as order, quantity and importance.

Suppose that the search term contains a series of m characters $q_1, q_2, \ldots, q_m$, and the description text of the geographic location contains n characters $p_1, p_2, \ldots, p_n$, then after the corresponding character vector representations are obtained, vectors y and z having the same dimension are obtained through the respective neural networks (suppose that G( ) is the neural network corresponding to the search term, and H( ) is the neural network corresponding to the geographic location).

$$G(q_1, q_2, \ldots, q_m)=y$$

$$H(p_1, p_2, \ldots, p_n)=z$$

In addition, the vector representation of the each geographic location in the map database may be determined in real time during the retrieval process. However, exemplarily, it may be predetermined so that a result may be called directly in the retrieval process, that is, the determination of the vector representation of the each geographic location in the map database has been performed offline in advance.

Then, the similarity between the vector representation of the search term and the vector representation of the each geographic location in the map database is determined. A similarity s between vector y and vector z may be quantified in a way such as cosine similarity:

$$s = S(q_1, q_2, \ldots, q_m; p_1, p_2, \ldots, p_n) = \operatorname{cosine}(y, z)$$

Finally, the geographic location is retrieved according to the similarity determined. The similarity may be used independently as the basis of the geographic location sorting, or in a non-independent manner, that is, the similarity may be integrated into the existing sorting model by one of the feature vectors.

When the similarity is used independently as the basis of the geographic location sorting, the each geographic location may be sorted according to the similarity from high to low, and the geographic location is retrieved according to the sorting result. For example, the first N geographic locations are selected as the geographic locations retrieved, where N is a preset positive integer. For another example, the geographic location with a similarity exceeding a preset similarity threshold is selected as the geographic location retrieved. For yet another example, the geographic locations are displayed according to the similarity from high to low, and the number of the geographic locations displayed is determined according to the user operation (for example, five geographic locations may be displayed on one page, and the next five geographic locations may be displayed if the user pulls down the page to refresh).

When the non-independent manner is adopted, a similarity characteristic may be determined by using the similarity. The similarity characteristic may be used as one of the input vectors of the pre-trained sorting model, and the geographic location is retrieved according to the sorting result of the each geographic location obtained by the sorting model.

With the implementation method of this embodiment, following retrieval requirements may be satisfied.

First Retrieval Requirement

When the user enters the search term "埃菲尔铁塔", each character in the search term and each character in the description text of the geographic location are mapped to the same vector space by using the international character vector representation dictionary. Even if a French name "La Tour Eiffel" or an English name "Eiffel Tower" is used in the description text, they have a very close distance in the same vector space, and a cross-language retrieval of the geographic location may be achieved.

Second Retrieval Requirement

When the user enters the search term "ABC", each character in the search term and each character in the description text of the geographic location are mapped to the same vector space, and the vector representation of the search term and the vector representation of the geographic location are obtained by using the vector representation of the each character. Even if a full name "Kentucky Fried Chicken" is used in the description text, they have a very close distance in the same vector space, and a semantic-based retrieval of the geographic location may be achieved.

Based on the structure and principle of the similarity model described above, the training process of the similarity model will be described in detail below in conjunction with the second embodiment.

In the present disclosure, in order to enable the geographic location with sparse clicks or the geographic location that has never been clicked (such as a newly-appearing geographic location) to obtain a good search sorting result as much as possible, the existing high-frequency clicked geographic location and a low-frequency clicked or non-clicked geographic location are correlated from another perspective in this embodiment. Therefore, in addition to the historical click log, the historical browsing log is introduced in the model training process, and the correlation between the geographic locations is established based on the browsing co-occurrence relationship.

Figure 3:
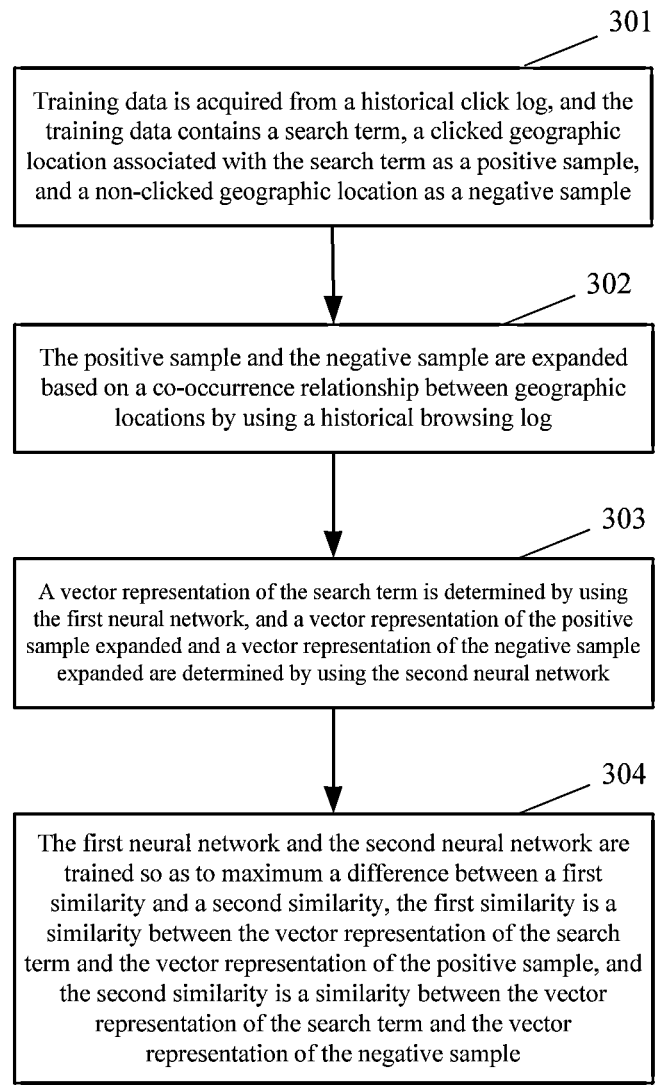
FIG. 3 shows a flowchart of a method of training a similarity model provided in another embodiment of the present disclosure.

FIG. 3 shows a flowchart of a method of training a similarity model provided in another embodiment of the present disclosure. As shown in FIG. 3, the method includes following steps.

In step 301, training data is acquired from a historical click log, and the training data contains a search term, a clicked geographic location associated with the search term as a positive sample, and a non-clicked geographic location as a negative sample.

In this step, when the training data is acquired, each training data actually contains a positive and negative sample pair. For the same search term, a clicked geographic location is selected as the positive sample from the corresponding search results, and a non-clicked geographic location is selected as the negative sample.

For example: suppose that in the historical click log, the search results corresponding to the search term "ABC" contain geographic locations of Restaurant A (XX1 store), Restaurant A (XX2 store), Restaurant A (XX3 store), etc. If the user clicks "Restaurant A (XX2 store)" and the other geographic locations are not clicked, one of the training data may contain "ABC"—"Restaurant A (XX2 store)" as the positive sample pair and "ABC"—"Restaurant A (XX3 store)" as the negative sample pair.

A plurality of training data may be selected in this way.

In step 302, the positive sample and the negative sample are expanded based on a co-occurrence relationship between geographic locations by using a historical browsing log.

In addition to the historical click log, the historical browsing log is further introduced in the present disclosure. The historical browsing log is obtained from the user's browsing behavior record of geographic location, which includes but is not limited to: browsing behavior of user in the retrieval process, browsing behavior of randomly viewing geographic location in map application, browsing behavior according to information recommendation of map application, etc.

Figure 4:
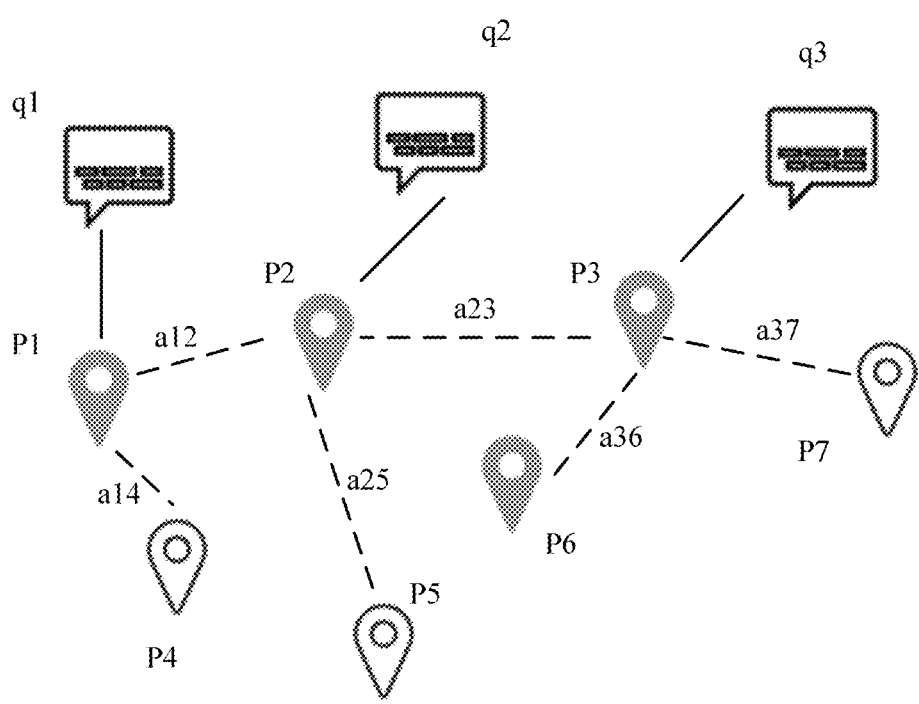
FIG. 4 shows a schematic diagram of a semantic map provided in another embodiment of the present disclosure.

For a more intuitive understanding, FIG. 4 is described by way of example. In FIG. 4, for search terms "q1", "q2" and "q3", in the historical click log, a clicked geographic location P1 corresponds to q1, a clicked geographic location P2 corresponds to q2, and a clicked geographic location P3 corresponds to q3. The click-based relationship is represented by a solid line in FIG. 4. However, based on the historical browsing log, the user also browsed P2 and P4 together with P1. It may be considered that P1 and P2 have a co-occurrence relationship, and P1 and P4 have a co-occurrence relationship. If a plurality of geographic locations are browsed in a session, it is considered that the plurality of geographic locations have a co-occurrence relationship.

In FIG. 4, a dotted line is used to represent the correlation between the geographic locations which is based on the browsing co-occurrence relationship. In order to facilitate the expansion of samples, a semantic map may be formed by using the correlation between geographic locations based on the historical browsing log. The semantic map contains nodes associated with geographic locations, and the correlation between the geographic locations means that the geographic locations have the browsing co-occurrence relationship. The geographic locations may further have a correlation parameter. For example, as shown in FIG. 4, "a12" is a correlation parameter between P1 and P2, "a14" is a correlation parameter between P1 and P4, and "a23" is a correlation parameter between P2 and P3, and so on. The correlation parameter reflects a degree of browsing co-occurrence of the geographic locations. It may be determined initially according to a co-occurrence condition of the corresponding geographic locations, for example, according to the number of co-occurrence. More co-occurrences correspond to a greater correlation parameter value. The correlation parameter value may play a role in the subsequent training process, which is to be described in step 303.

In this step, each geographic location that has a browsing co-occurrence relationship with the clicked geographic location may be acquired from the semantic map to expand the positive sample, and the geographic location that has a browsing co-occurrence relationship with the non-clicked geographic location may be acquired to expand the negative sample. By expanding the positive sample and the negative sample by using the semantic map, the browsing co-occurrence relationship between the geographic locations may be directly found from the semantic map, which is more convenient and more efficient.

For example, for a training data, q1-P1 is a positive sample pair, and q1-P7 is a negative sample pair. After expansion, the geographic locations P1, P2 and P4 may form the positive sample, and the geographic locations P7 and P3 may form the negative sample.

After the expansion, continue to perform following steps to obtain the similarity model containing the first neural network and the second neural network by using the expanded training samples.

In step 303, a vector representation of the search term is determined by using the first neural network, and a vector representation of the positive sample expanded and a vector representation of the negative sample expanded are determined by using the second neural network.

Figure 5:
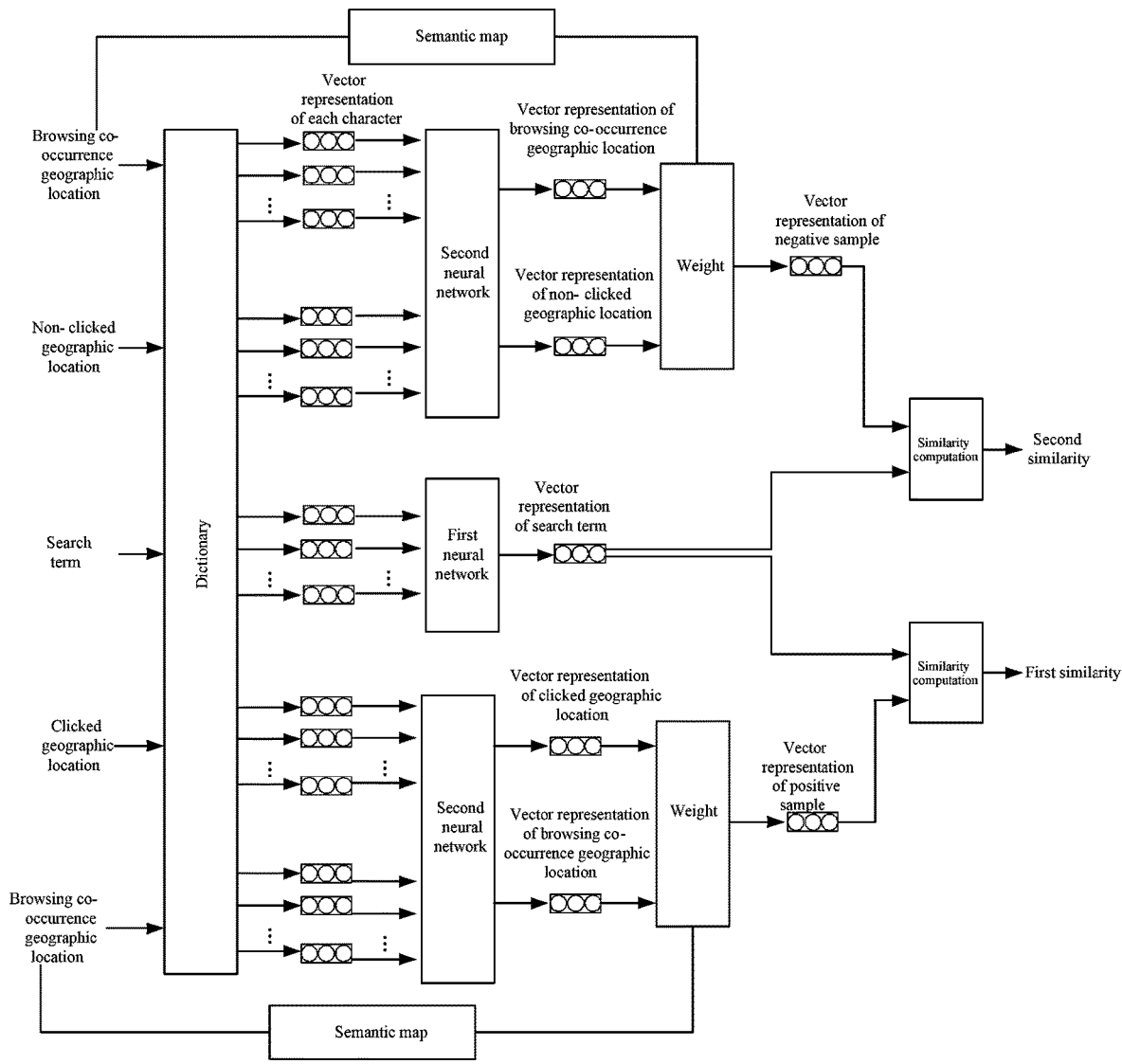
FIG. 5 shows a schematic principle diagram of training the similarity model provided in another embodiment of the present disclosure.

Specifically, as shown in FIG. 5, the vector representation of each character in the training data, that is, the vector representation of each character in the search term, the vector representation of each character in the description text of the clicked geographic location and the geographic location that has a browsing co-occurrence relationship with the clicked geographic location, and the vector representation of each character in the description text of the non-clicked geographic location and the geographic location that has a browsing co-occurrence relationship with the non-clicked geographic location, is determined first by using the character vector representation dictionary (shown as "dictionary").

The character vector representation dictionary here may be a pre-trained dictionary, and it may be updated during the training process of the similarity model. In addition, the character vector representation dictionary may be a single language dictionary or an international character vector representation dictionary. All characters, regardless of language, may be mapped to the same vector space through the international character vector representation dictionary. The vector representations of all characters have the same dimension.

Then, the vector representation of the each character of the search term is input into the first neural network, so as to obtain the vector representation of the search term.

The vector representation of the each character in the description text of the clicked geographic location is input into the second neural network so as to obtain the vector representation of the clicked geographic location, and the vector representation of the each character in the description text of the geographic location that has a browsing co-occurrence relationship with the clicked geographic location (shown as a browsing co-occurrence geographic location) is input into the second neural network so as to obtain the vector representation of the browsing co-occurrence geographic location. The vector representation of each geographic location output by the second neural network is weighted according to the correlation parameter between the corresponding geographic locations in the semantic map, so as to obtain the vector representation of the positive sample.

The semantic map shown in FIG. 4 is still illustrated by way of example. The positive sample geographic locations corresponding to q1 include P1, P2, P4. After the second neural network obtains a vector representation V1 of P1, a vector representation V2 of P2 and a vector representation V4 of P4, following weighting processing may be performed to obtain the vector representation of the positive sample:

$$z^+=V1+a12*V2+a14*V4$$

The vector representation of the each character in the description text of the non-clicked geographic location as well as the vector representation of the each character in the description text of the geographic location that has a browsing co-occurrence relationship with the non-clicked geographic location are input into the second neural network. The vector representation of each geographic location output by the second neural network is weighted according to the correlation parameter between the corresponding geographic locations in the semantic map, so as to obtain the vector representation of the negative sample.

Following the above example, the negative sample geographic locations corresponding to q1 include P7 and P3, and the second neural network obtains a vector representation V7 of P7 and a vector representation V3 of P3. Following weighting processing is performed according to the semantic map shown in FIG. 4, so as to obtain the vector representation $z^-$ of the negative sample.

$$z^-=V7+a37*V3$$

The present disclosure does not limit the types of the first neural network and the second neural network, as long as the output vectors of the two neural networks have the same dimension. For example, CNN (Convolutional Neural Networks) and ERNIE (Enhanced Representation through kNnowledge IntEgration) may be used as the two neural networks.

In step 304, the first neural network and the second neural network are trained so as to maximum a difference between a first similarity and a second similarity, the first similarity is a similarity between the vector representation of the search term and the vector representation of the positive sample, and the second similarity is a similarity between the vector representation of the search term and the vector representation of the negative sample.

The first similarity between the vector representation of the search term and the vector representation of the positive sample as well as the second similarity between the vector representation of the search term and the vector representation of the negative sample are determined. The first similarity and the second similarity are used to train the character vector representation dictionary (if the character vector representation dictionary is pre-trained, it is not trained here), the semantic map, the first neural network and the second neural network, so as to maximize a difference between the first similarity and the second similarity.

That is to say, a training target is to maximize the first similarity, minimize the second similarity, and maximize the difference between the first similarity and the second similarity.

The training target may be expressed as a minimized loss function, and the loss function Loss may be used such as:

$$\text{Loss}=\max[0,\gamma+\cosine(y,z^+)-\cosine(y,z^-)]$$

Where y is the vector representation of the search term, $z^+$ is the vector representation of the positive sample, $z^-$ is the vector representation of the negative sample, and $\gamma$ is a hyperparameter.

During the training process, the Loss value is used to iteratively update the model parameters, including the character vector representation dictionary, the semantic map, the parameters of the first neural network and the second neural network, until the training target is reached. For example, the value of Loss meets the preset requirements, the number of iterations meets the preset requirements, and so on.

During the training process, the correlation parameters in the semantic map may also be updated, so that the correlation between the geographical locations based on the browsing co-occurrence is gradually optimized so as to achieve the training target.

By the model training method provided by this embodiment, the cold start problem of the retrieval of geographic location with sparse clicks may be solved, and following retrieval requirements may be satisfied.

For some new geographic locations, such as a new store "Restaurant A (XX2 store)", it is difficult to retrieve the new geographic location through the model established in this embodiment, because the new geographic location does not appear in the historical click log or have sparse clicks. However, in a session, the user browsed the long-standing geographic location "Restaurant A (XX1 store)" and also browsed "Restaurant A (XX2 store)", or browsed both "Restaurant A (XX1 store)" and "Restaurant A (XX2 store)"

in the information recommendation function of the map application. Then, in the model establishing method of a following embodiment, the correlation between the geographical locations "Restaurant A (XX1 store)" and "Restaurant A (XX2 store)" is established in the semantic map. "Restaurant A (XX1 store)" is a long-standing geographical location with many historical clicks. Therefore, in the process of establishing the similarity model, when "Restaurant A (XX1 store)" is used as the positive sample for training, "Restaurant A (XX2 store)" also makes a contribution to the vector representation of the positive sample, so that "Restaurant A (XX2 store)" is associated to the search term "ABC" of "Restaurant A (XX2 store)". Accordingly, when the user enters the search term "ABC", "Restaurant A (XX2 store)" may also appear in the search results based on the similarity, thereby solving the cold start problem of "Restaurant A (XX2 store)".

The above is a detailed description of the method provided in the present disclosure. The apparatus provided in the present disclosure is described in detail below in conjuction with the embodiments.

Figure 6:
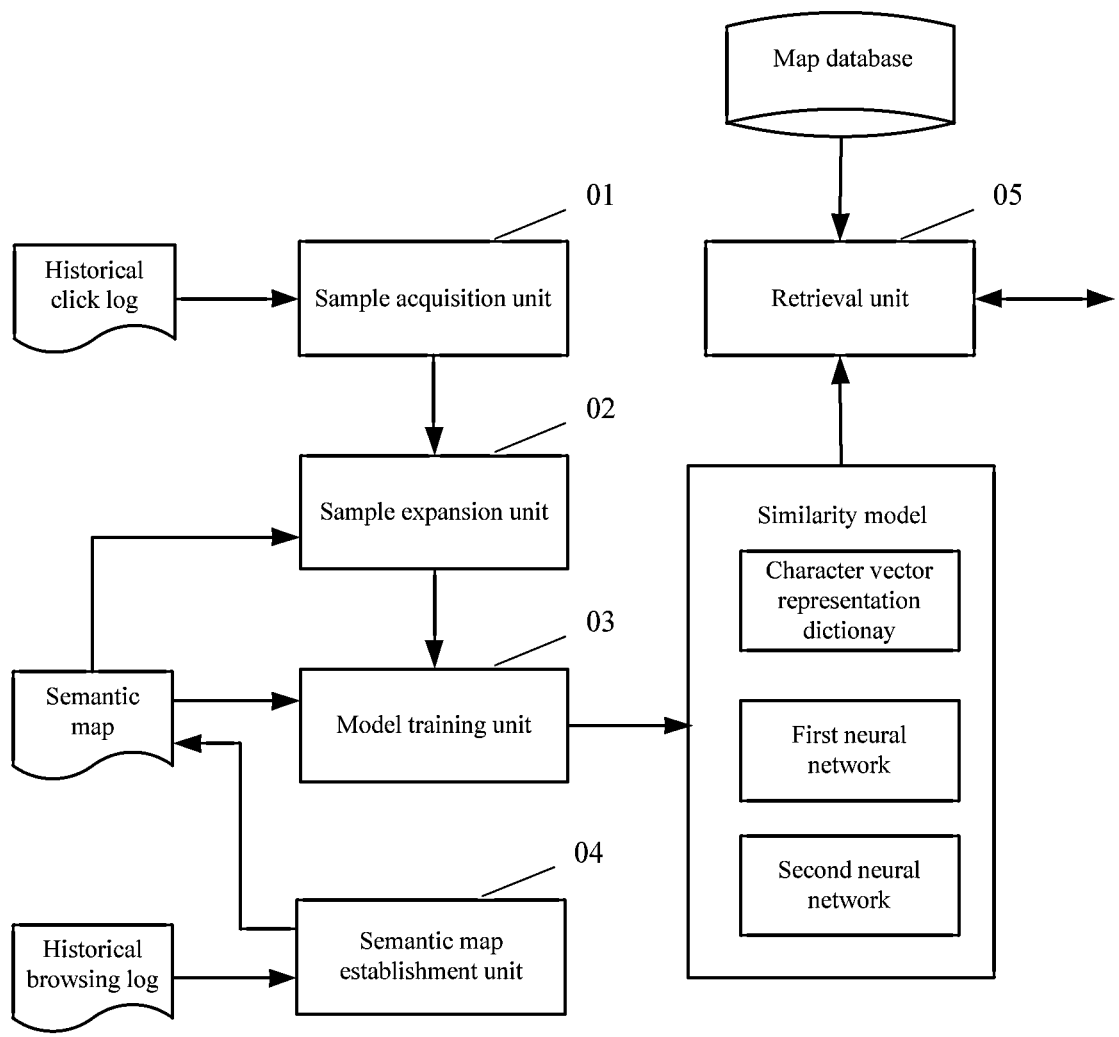
FIG. 6 shows a structural diagram of an apparatus for retrieving a geographic location provided by an embodiment of the present disclosure.

FIG. 6 shows a structural diagram of the apparatus for retrieving the geographical location provided by the embodiment of the present disclosure. The apparatus may be an application on the server side, or a functional unit, such as a plug-in or software development kit (SDK) of an application on the server side, which is not specifically limited in the embodiments of the present disclosure. As shown in FIG. 6, the apparatus may include a sample acquisition unit 01, a sample expansion unit 02 and a model training unit 03, and may further include a semantic map establishment unit 04 and a retrieval unit 05.

The sample acquisition unit 01 is used to acquire training data from a historical click log. The training data contains a search term, a clicked geographic location associated with the search term as a positive sample, and a non-clicked geographic location as a negative sample.

The sample expansion unit 02 is used to expand the positive sample and the negative sample based on a co-occurrence relationship between geographic locations by using a historical browsing log.

Specifically, the sample expansion unit 02 may determine each first geographic location having a browsing co-occurrence relationship with the clicked geographic location, based on the semantic map, so as to expand the positive sample, and determine each second geographic location having a browsing co-occurrence relationship with the non-clicked geographic location, based on the semantic map, so as to expand the negative sample.

The model training unit 03 is used to perform a training by using the positive sample and the negative sample expanded so as to obtain the similarity model containing a first neural network and a second neural network, including: determining a vector representation of the search term by using the first neural network, and determining a vector representation of the positive sample expanded and a vector representation of the negative sample expanded, by using the second neural network; and training the first neural network and the second neural network so as to maximum a difference between a first similarity and a second similarity, wherein the first similarity is a similarity between the vector representation of the search term and the vector representation of the positive sample, and the second similarity is a similarity between the vector representation of the search term and the vector representation of the negative sample.

In determining the vector representation of the positive sample expanded and the vector representation of the negative sample expanded by using the second neural network, the model training unit 03 may respectively determine the vector representation of each geographic location in the positive sample expanded and the vector representation of each geographic location in the negative sample expanded by using the second neural network; weight the vector representation of each geographic location in the positive sample expanded, according to a correlation parameter between the each first geographic location and the clicked geographic location in the semantic map, so as to obtain the vector representation of the positive sample; and weight the vector representation of each geographic location in the negative sample expanded, according to a correlation parameter between the each second geographic location and the non-clicked geographic location in the semantic map, so as to obtain the vector representation of the negative sample.

The semantic map establishment unit 04 is used to establish the semantic map based on the historical browsing log. The semantic map contains nodes associated with geographic locations, nodes associated with the geographic locations having the browsing co-occurrence relationship are correlated, and the correlation parameter between the geographic locations is initially determined based on a co-occurrence condition of the geographic locations. The model training unit 03 may update the correlation parameter between the geographic locations in the semantic map during the training process.

As an exemplary implementation, the similarity model further contains a character vector representation dictionary used to determine a vector representation of each character in the training data expanded.

Specifically, the model training unit 03 may input the vector representation of the each character of the search term into the first neural network, so as to obtain the vector representation of the search term; and input a vector representation of each character in a description text of the each geographic location in the positive sample expanded or the each geographic location in the negative sample expanded into the second neural network, so as to obtain the vector representation of the each geographic location.

The retrieval unit 05 is used to retrieve a geographic location matching a search term inputted by a user, by using the similarity model trained, in response to receiving the search term inputted by the user.

The retrieval unit 05 may determine a vector representation of the search term inputted by the user, by using the first neural network; determine a similarity between the vector representation of the search term inputted by the user and a vector representation of each geographic location in a map database; and retrieve the geographic location based on the similarity. The vector representation of the each geographic location in the map database is determined by using the second neural network.

Further, the similarity model further contains a character vector representation dictionary. In this case, in determining the vector representation of the search term by using the first neural network, the retrieval unit 05 may determine the vector representation of the each character in the search term by using the character vector representation dictionary; and input the vector representation of the each character in the search term inputted by the user into the first neural network, so as to obtain the vector representation of the search term inputted by the user.

In determining the vector representation of the geographic location in the map database by using the second neural network, the retrieval unit 05 may determine the vector representation of each character in a description text of the each geographic location in the map database by using the character vector representation dictionary; and input the vector representation of the each character in the description text of the geographic location into the second neural network, so as to obtain the vector representation of the geographic location.

As an exemplary implementation, the character vector representation dictionary is an international character vector representation dictionary used to map characters of at least two languages to the same vector space.

The description text of the geographic location may contain at least one of a name, a label, an address, an evaluation and a photo description text.

Specifically, in retrieving the geographic location according to the similarity, the retrieval unit 05 may sort the each geographic location in the map database according to the similarity from high to low, and retrieve the geographic location based on a sorting result. Alternatively, a similarity characteristic may be determined by using the similarity and used as one of input vectors of a sorting model pre-trained, and the geographic location is retrieved based on a sorting result of the each geographic location in the map database determined by the sorting model.

According to the embodiments of the present disclosure, the present disclosure further provides an electronic device and a readable storage medium.

Figure 7:
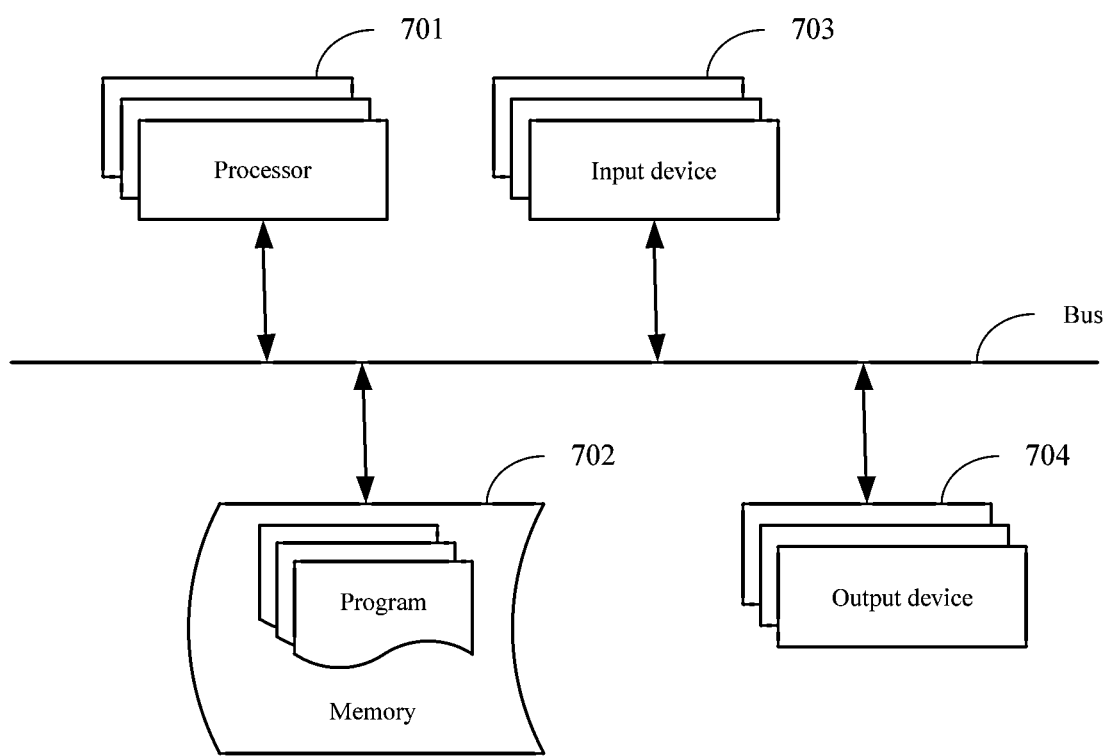
FIG. 7 shows a block diagram of an electronic device according to an embodiment of the present disclosure.

FIG. 7 shows a block diagram of an electronic device according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device may include one or more processors 701, a memory 702, and interface(s) for connecting various components, including high-speed interface(s) and low-speed interface(s). The various components are connected to each other by using different buses, and may be installed on a common motherboard or installed in other manners as required. The processor may process instructions executed in the electronic apparatus, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic apparatuses may be connected in such a manner that each apparatus providing a part of necessary operations (for example, as a server array, a group of blade servers, or a multi-processor system). In FIG. 7, a processor 701 is illustrated by way of example.

The memory 702 is a non-transitory computer-readable storage medium provided by the present disclosure. The memory stores instructions executable by at least one processor, to cause the at least one processor to perform the method of establishing the similarity model provided in the present disclosure. The non-transitory computer-readable storage medium of the present disclosure stores computer instructions for allowing a computer to execute the method of establishing the similarity model provided in the present disclosure.

The memory 702, as a non-transitory computer-readable storage medium, may be used to store non-transitory software programs, non-transitory computer-executable programs and modules, such as program instructions/modules corresponding to the method of establishing the similarity model in the embodiments of the present disclosure. The processor 701 executes various functional applications and data processing of the server by executing the non-transient software programs, instructions and modules stored in the memory 702, thereby implementing the method of establishing the similarity model in the embodiments of the method mentioned above.

The memory 702 may include a program storage area and a data storage area. The program storage area may store an operating system and an application program required by at least one function. The data storage area may store data etc. generated by using the electronic device according to the method of establishing the similarity model. In addition, the memory 702 may include a high-speed random access memory, and may further include a non-transitory memory, such as at least one magnetic disk storage device, a flash memory device, or other non-transitory solid-state storage devices. In some embodiments, the memory 702 may optionally include a memory provided remotely with respect to the processor 701, and such remote memory may be connected through a network to the electronic device for the method of establishing the similarity model. Examples of the above-mentioned network include, but are not limited to the Internet, intranet, local area network, mobile communication network, and combination thereof.

The electronic device for the method of establishing the similarity model may further include an input device 703 and an output device 704. The processor 701, the memory 702, the input device 703 and the output device 704 may be connected by a bus or in other manners. In FIG. 7, the connection by a bus is illustrated by way of example.

The input device 703 may receive input information of numbers or character, and generate key input signals related to user settings and function control of the electronic device for the method of establishing the similarity model, such as a touch screen, a keypad, a mouse, a track pad, a touchpad, a pointing stick, one or more mouse buttons, a trackball, a joystick, and so on. The output device 704 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred as programs, software, software applications, or codes) include machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the protection scope of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of establishing a similarity model for retrieving a geographic location, comprising:
    acquiring training data from a historical click log, wherein the training data contains a search term, a clicked geographic location associated with the search term as a positive sample, and a non-clicked geographic location as a negative sample;
    expanding the positive sample and the negative sample based on a co-occurrence relationship between geographic locations by using a historical browsing log; and
    performing a training by using the positive sample and the negative sample expanded so as to obtain the similarity model containing a first neural network and a second neural network;
    wherein the performing a training comprises:
    determining a vector representation of the search term by using the first neural network, and determining a vector representation of the positive sample expanded and a vector representation of the negative sample expanded, by using the second neural network; and
    training the first neural network and the second neural network so as to maximum a difference between a first similarity and a second similarity, wherein the first similarity is a similarity between the vector representation of the search term and the vector representation of the positive sample, and the second similarity is a similarity between the vector representation of the search term and the vector representation of the negative sample.

2. The method of claim 1, wherein the expanding the positive sample and the negative sample based on a co-occurrence relationship between geographic locations by using a historical browsing log comprises:
    determining each first geographic location having a browsing co-occurrence relationship with the clicked geographic location, based on a semantic map, so as to expand the positive sample, and determining each second geographic location having a browsing co-occurrence relationship with the non-clicked geographic location, based on the semantic map, so as to expand the negative sample.

3. The method of claim 2, wherein the semantic map is established based on the historical browsing log; and
    wherein the semantic map contains nodes associated with geographic locations, nodes associated with the geographic locations having the browsing co-occurrence relationship are correlated, and the correlation parameter between the geographic locations is initially determined based on a co-occurrence condition of the geographic locations and is updated during the training.

4. The method of claim 1, wherein the determining a vector representation of the positive sample expanded and a vector representation of the negative sample expanded, by using the second neural network comprises:
    determining a vector representation of each geographic location in the positive sample expanded and a vector representation of each geographic location in the negative sample expanded, by using the second neural network;
    weighting the vector representation of each geographic location in the positive sample expanded, according to a correlation parameter between the each first geographic location and the clicked geographic location in the semantic map, so as to obtain the vector representation of the positive sample; and weighting the vector representation of each geographic location in the negative sample expanded, according to a correlation parameter between the each second geographic location and the non-clicked geographic location in the semantic map, so as to obtain the vector representation of the negative sample.

5. The method of claim 4, wherein the similarity model further contains a character vector representation dictionary configured to determine a vector representation of each character in the training data expanded;

wherein the determining a vector representation of the search term by using the first neural network comprises: inputting a vector representation of each character in the search term into the first neural network, so as to obtain the vector representation of the search term; and wherein the determining a vector representation of each geographic location in the positive sample expanded and a vector representation of each geographic location in the negative sample expanded, by using the second neural network comprises: inputting a vector representation of each character in a description text of the each geographic location in the positive sample expanded or the each geographic location in the negative sample expanded into the second neural network, so as to obtain the vector representation of the each geographic location.

6. The method of claim 5, wherein the character vector representation dictionary is an international character vector representation dictionary configured to map characters of at least two languages to the same vector space.

7. The method of claim 5, wherein the description text of the each geographic location contains at least one of a name, a label, an address, an evaluation and a photo description text.

8. The method of claim 1, further comprising:

retrieving a geographic location matching a search term inputted by a user, by using the similarity model trained, in response to receiving the search term inputted by the user.

9. The method of claim 8, wherein the retrieving a geographic location matching a search term inputted by a user, by using the similarity model trained comprises:

determining a vector representation of the search term inputted by the user, by using the first neural network;

determining a similarity between the vector representation of the search term inputted by the user and a vector representation of each geographic location in a map database; and retrieving the geographic location based on the similarity;

wherein the vector representation of the each geographic location in the map database is determined by using the second neural network.

10. The method of claim 9, wherein the similarity model further contains a character vector representation dictionary;

wherein the determining a vector representation of the search term inputted by the user, by using the first neural network comprises: determining a vector representation of each character in the search term inputted by the user, by using the character vector representation dictionary; and inputting the vector representation of the each character in the search term inputted by the user into the first neural network, so as to obtain the vector representation of the search term inputted by the user; and wherein the determining the vector representation of the each geographic location in the map database by using the second neural network comprises: determining a vector representation of each character in a description text of the each geographic location in the map database by using the character vector representation dictionary; and inputting the vector representation of the each character in the description text of the each geographic location into the second neural network, so as to obtain the vector representation of the each geographic location.

11. The method of claim 9, wherein the retrieving the geographic location based on the similarity comprises:

sorting the each geographic location in the map database according to the similarity from high to low, and retrieving the geographic location based on a sorting result; or determining a similarity characteristic by using the similarity, using the similarity characteristic as one of input vectors of a sorting model pre-trained, and retrieving the geographic location based on a sorting result of the each geographic location in the map database determined by the sorting model.

12. An electronic device, comprising:

at least one processor; and a memory communicatively connected to the at least one processor, wherein the memory stores instructions executable by the at least one processor, and the instructions, when executed by the at least one processor, cause the at least one processor to implement operations of establishing a similarity model for retrieving a geographic location, comprising:

acquiring training data from a historical click log, wherein the training data contains a search term, a clicked geographic location associated with the search term as a positive sample, and a non-clicked geographic location as a negative sample;

expanding the positive sample and the negative sample based on a co-occurrence relationship between geographic locations by using a historical browsing log; and performing a training by using the positive sample and the negative sample expanded so as to obtain the similarity model containing a first neural network and a second neural network;

wherein the performing a training comprises:

determining a vector representation of the search term by using the first neural network, and determining a vector representation of the positive sample expanded and a vector representation of the negative sample expanded, by using the second neural network; and training the first neural network and the second neural network so as to maximum a difference between a first similarity and a second similarity, wherein the first similarity is a similarity between the vector representation of the search term and the vector representation of the positive sample, and the second similarity is a similarity between the vector representation of the search term and the vector representation of the negative sample.

13. A non-transitory computer-readable storage medium having computer instructions stored thereon, wherein the computer instructions, when executed by a computer, causes the computer to implement operations of establishing a similarity model for retrieving a geographic location, comprising:
- acquiring training data from a historical click log, wherein the training data contains a search term, a clicked geographic location associated with the search term as a positive sample, and a non-clicked geographic location as a negative sample;
- expanding the positive sample and the negative sample based on a co-occurrence relationship between geographic locations by using a historical browsing log; and
- performing a training by using the positive sample and the negative sample expanded so as to obtain the similarity model containing a first neural network and a second neural network;
- wherein the performing a training comprises:
- determining a vector representation of the search term by using the first neural network, and determining a vector representation of the positive sample expanded and a vector representation of the negative sample expanded, by using the second neural network; and
- training the first neural network and the second neural network so as to maximum a difference between a first similarity and a second similarity, wherein the first similarity is a similarity between the vector representation of the search term and the vector representation of the positive sample, and the second similarity is a similarity between the vector representation of the search term and the vector representation of the negative sample.

* * * * *